United States Patent
Watanabe et al.

(10) Patent No.: US 7,408,665 B2
(45) Date of Patent: Aug. 5, 2008

(54) PRINT SERVICE SYSTEM AND PRINT SERVICE SERVER

(75) Inventors: Mikio Watanabe, Asaka (JP); Hideki Kashima, Asaka (JP); Hiroyuki Kurase, Asaka (JP)

(73) Assignee: Fujifilm Corporation, Tokyo (JP)

( * ) Notice: Subject to any disclaimer, the term of this patent is extended or adjusted under 35 U.S.C. 154(b) by 971 days.

(21) Appl. No.: 10/635,515

(22) Filed: Aug. 7, 2003

(65) Prior Publication Data
US 2004/0034727 A1 Feb. 19, 2004

(30) Foreign Application Priority Data
Aug. 19, 2002 (JP) ............... P.2002-238346

(51) Int. Cl.
*G06F 15/00* (2006.01)

(52) U.S. Cl. ............... 358/1.15; 348/207.1; 348/207.2; 348/333.02; 705/26

(58) Field of Classification Search ............... 358/1.15; 348/207.1, 207.2, 333.02; 705/26
See application file for complete search history.

(56) References Cited

U.S. PATENT DOCUMENTS

| | | | | | |
|---|---|---|---|---|---|
| 6,222,646 | B1 * | 4/2001 | Maurinus et al. | ............. | 358/440 |
| 6,833,861 | B2 * | 12/2004 | Matsumoto et al. | ....... | 348/207.2 |
| 6,883,146 | B2 * | 4/2005 | Prabhu et al. | ............... | 715/854 |
| 6,938,066 | B1 * | 8/2005 | Doi | ............ | 709/202 |
| 7,203,158 | B2 * | 4/2007 | Oshima et al. | ............. | 370/208 |
| 2002/0145752 | A1 * | 10/2002 | Hanabusa et al. | .......... | 358/1.15 |

FOREIGN PATENT DOCUMENTS

| | | |
|---|---|---|
| JP | 11-55726 | 2/1999 |
| JP | 2001-309284 | 11/2001 |
| JP | 2002-49797 | 2/2002 |
| JP | 2002-132462 | 5/2002 |
| JP | 2002-232763 | 8/2002 |

OTHER PUBLICATIONS

Japanese Office Action dated Feb. 27, 2008, with English language translation.

* cited by examiner

*Primary Examiner*—David K Moore
*Assistant Examiner*—Mark R Milia
(74) *Attorney, Agent, or Firm*—McGinn IP Law Group, PLLC

(57) ABSTRACT

A print service system capable of providing effectively a print service in the amusement park is provided. The print service system is constructed to include a print service server connected to a network, which is established in an amusement park, access points, and a digital camera. The print service server executes a print service based on printing order information that is received via the network and contains receipt information designating a receiving spot of a print. Prior to reception of the print receiving spot information included in the order information, the information for assisting the decision of the receiving spot are generated and transmitted. The candidate information of the receiving spot and the information about attractions corresponding to the candidate information are included in the assist information.

20 Claims, 5 Drawing Sheets

PRINT SERVICE SYSTEM AND PRINT SERVICE SERVER

BACKGROUND OF THE INVENTION

1. Field of the Invention

The present invention relates to a print service system and a print service server for providing a print service based on digital image information in an amusement park.

2. Description of the Related Art

In an amusement park, in order to reply to user's request to get quickly the print of the image picked up by the camera, print service shops are provided at several spots in the amusement park. Then, when a user brings a finished roll of film to the print service shop so as to order the development and the printing, the user can receive a print after a predetermined time.

Since the user must go to the print service shop basically twice when he orders the printing and when he receives a print, the user may feels troublesome. If the number of locations of the print service shop is increased, the convenience at the time of ordering the printing can be improved to some extent. However, such a problem still remains, because a receiving time and a receiving shop are apt to concentrate to particular ones, the user cannot quickly receive a print. In other words, for the convenience of the reception, the user selects the print service shop located near the gate of the amusement park as the receiving shop, and also the receiving time tends to concentrate about the closing time of the amusement park. As a result, there exists such a problem, when the closing time comes near, the print service shop located near the gate of the amusement park is overcrowded with customers and thus the user cannot quickly receive the print.

This causes such a necessity that the printing equipment and the person in charge of the service should be provided on the print service supplier side to correspond to such concentrated work amount. Thus, this becomes a big problem.

Meanwhile, the digital camera records the picked-up image data as digital data. Therefore, when an image is picked up by using the digital camera, such picked-up image data can be transmitted via the communication line, and thus the user can order the printing not to go to the service shop. As a result, various service systems for printing based on the image data, which are transmitted from the digital camera with a communication function, have been proposed.

Even if such service system is employed, the user orders the printing while experiencing an attraction in the amusement park, and thus it is not easy to designate the print receiving shop effectively. Therefore, the problem such that the print receiving shop and the receiving time are apt to concentrate cannot be overcome yet.

SUMMARY OF THE INVENTION

An object of the present invention is to provide a print service system capable of providing effectively a print service in an amusement park, and a print service server employed in such system.

The invention provides a print service system for providing a print service based on digital image information in an amusement park, comprising: a print service server connected to a network; and a digital camera that has a communication function and is connected to the print service server via the network; wherein the digital camera transmits digital image information to be printed and order information including receipt information indicating a spot for receiving a print to the print service server via the network, and the print service server, which is accessible to a database storing information about attractions in the amusement park, transmits candidate information of receiving spots including receivable time information and the information about attractions corresponding to the candidate information to the digital camera prior to receiving the receipt information based on existing position information of the digital camera, and also transmits print instruction information including the digital image information received from the digital camera to a printing device provided in a spot that corresponds to the receipt information received from the digital camera.

According to this system, a user can obtain quickly a print of the picked-up image while enjoying attractions in the amusement park. Also, the print service shop and the receiving time can be dispersed, and thus load leveling of the work can be expected on the print service supplier side.

Further, the digital camera is connected to the print service server via a plurality of radio communication access points that are provided in the amusement park, and the print service server obtains existing position information of the digital camera based on installation positions of the radio communication access points. According to the configuration, the existing position of the digital camera can be easily obtained.

Further, the print service server transmits the candidate information of receiving spots in earlier order of the receivable time. Also, the digital camera transmits a desired time for receiving a print to the print service server, and the print service server transmits the candidate information of receiving spots in order that the receivable time is closer to the desired time. If the candidate information are transmitted in such order, the user who orders the printing can select effectively the receiving spot.

Further, the print service server transmits the information about attractions within a predetermined area where includes existing position of the digital camera and receiving spots indicated by the candidate information to the digital camera with the candidate information.

Further, the print service server transmits a model moving route information including available attractions from existing position of the digital camera to receiving spot indicated by the candidate information to the digital camera.

Further, the print service server, which is accessible to a visiting history database of a user, transmits visiting history information of an owner of the digital camera every attraction to the digital camera. If such information about attractions is transmitted, the user can utilize a time effectively until the user receives the print.

Further, the print service server accepts a reservation of the attraction.

Further, the print service server transmits the candidate information of receiving spot and the information about attractions corresponding to the candidate information to the digital camera with map information of the amusement park. If such information is transmitted, the user can simply grasp the receiving spot and the positions of the attractions.

Further, the print service server transmits the map information of the amusement park, which includes receiving spot transmitted from the digital camera and existing spot of the digital camera, to the digital camera in response to a request from the digital camera. According to the configuration, the user can grasp the positional relationship to the receiving spot on occasion.

Further, the map information to be transmitted to the digital camera includes imaging spot information of the amusement park.

The invention provides a print service server for providing a print service based on digital image information in an amusement park, wherein the print service server is accessible to a database storing information about attractions in the amusement park, and is connected to a digital camera via a network, the print service server receives digital image information to be printed and order information including receipt information indicating a spot for receiving a print via the network, and transmits print instruction information including the digital image information received from the digital camera to a printing device provided in a spot that corresponds to the receipt information received from the digital camera, and transmits candidate information of receiving spots including receivable time information and the information about attractions corresponding to the candidate information to the digital camera prior to receiving the receipt information based on existing position information of the digital camera.

Further, the print service server is connected to the digital camera via a plurality of radio communication access points that are provided in the amusement park, and the print service server utilizes installation position information of the radio communication access points as existing position information of the digital camera.

Further, the print service server transmits the candidate information of receiving spots in earlier order of the receivable time.

Further, the print service server receives a desired time for receiving a print from the digital camera, and the print service server transmits the candidate information of receiving spots in order that the receivable time is closer to the desired time.

Further, the print service server transmits the information about attractions within a predetermined area where includes existing position of the digital camera and receiving spots indicated by the candidate information to the digital camera with the candidate information.

Further, the print service server transmits a model moving route information including available attractions from existing position of the digital camera to receiving spot indicated by the candidate information to the digital camera.

Further, the print service server, which is accessible to a visiting history database of a user, transmits visiting history information of an owner of the digital camera every attraction to the digital camera.

Further, the print service server accepts a reservation of the attraction.

Further, the print service server transmits the candidate information of receiving spot and the information about attractions corresponding to the candidate information to the digital camera with map information of the amusement park.

Further, the print service server transmits the map information of the amusement park, which includes receiving spot transmitted from the digital camera and existing spot of the digital camera, to the digital camera in response to a request from the digital camera.

Further, the map information to be transmitted to the digital camera includes imaging spot information of the amusement park.

DETAILED DESCRIPTION OF THE PREFERRED EMBODIMENTS

Figure 1:
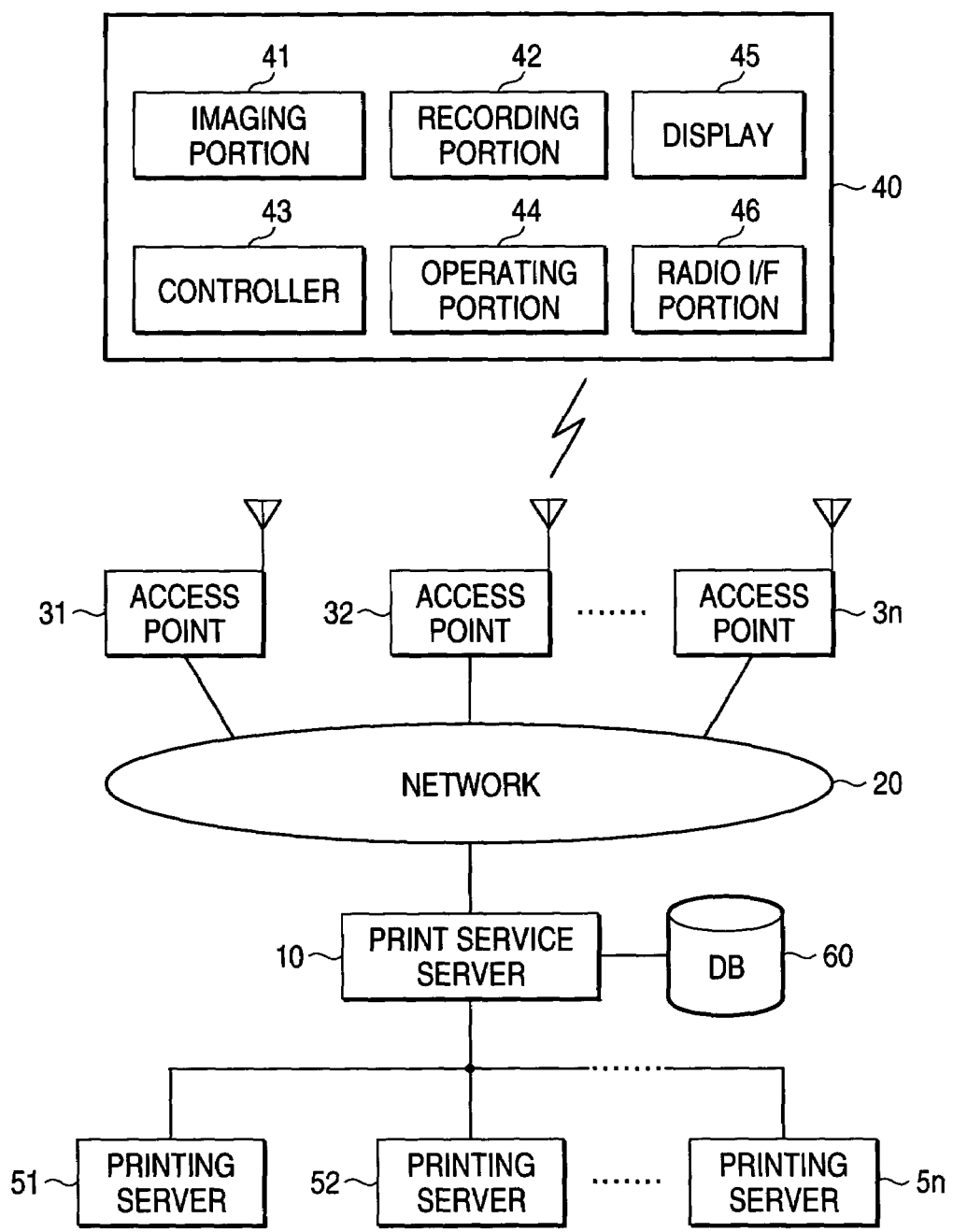
FIG. 1 is a view showing a schematic configuration of a print service system of the present invention.

An embodiment of the present invention will be explained with reference to the drawings hereinafter. FIG. 1 is a view showing a schematic configuration of a print service system of the present invention. The print service system shown in FIG. 1 provides a print service in an amusement park, and is constructed to include a print service server 10 connected to a network 20, which is established in the amusement park, access points 31, 32, 3n, and a digital camera 40.

The print service server 10 provides the print service based on printing order information, which is received via the network 20, and transmits digital image information included in the printing order information to any one of printing servers 51 to 5n, and causes the printing server to execute the printing. The printing servers 51 to 5n to which the digital image information is transmitted are selected according to print receiving spot information included in the printing order information. Also, as described in detail later, prior to the reception of the print receiving spot information included in the printing order information, information used to assist the decision of the receiving spot are generated and transmitted. Various information of the amusement park, which are stored in a database 60, are used for these processes.

The printing servers 51 to 5n are provided in the service shop, the laboratory, or the like in which the printing process is carried out based on the digital image information, and cause one or plural printing apparatuses (not shown) to execute the predetermined printing process. In FIG. 1, three printing server 51 to 5n are shown, but the number is not limited to 3. The print generated according to the instruction from the printing servers 51 to 5n can be received at the print service shops that provided at plural locations in the amusement park. The correspondence among the print service shop, the printing server, and the printing apparatus can be set freely, and can be decided according to the demand of the printing order, or the like. For example, the print service shop may be equipped with the printing server and the printing apparatus, otherwise may be equipped only with the printing apparatus that is connected to the printing server being provided at other location. Also, the shop in which the made print is delivered only may be provided. In such case, the made print is sent from other printing spot.

A plurality of access points 31 to 3n are connected to the network 20 to which the print service server 10 is connected. The access points 31 to 3n have a function of the host base station in the radio LAN based on the IEEE802.11b standard. In FIG. 1, only three access points are shown, but actually a large number of access points are provided. More particularly, the number and arrangement of the access points are decided such that the user is accessible to at least one of the access points 31 to 3n from the overall area of the amusement park.

The digital camera 40 has an imaging portion 41, a recording portion 42, a controller 43, an operating portion 44, a display 45, and a radio interface portion 46. The imaging portion 41 obtains digital image information by performing predetermined signal process for imaging signal picked up by optical system such as imaging lens, etc. and the image pickup device such as CCD, etc. The digital image signal obtained by the imaging portion 41 is recorded in the recording portion 42. The imaging process is controlled by the controller 43 based on the operation of the operating portion 44.

The display 45 displays a through-image at the time of imaging and an image based on digital image information recorded in the recording portion 42, information about state and operation of the digital camera 40, etc. Also, the display 45 displays various information at the time of ordering the printing described later. The radio interface portion 46 performs the radio LAN connection. The displaying process, the printing ordering process, and the radio LAN connecting process are controlled by the controller 43 based on the operation of the operating portion 44. Since all elements constituting the digital camera 40 are well known respectively, their detailed explanation will be omitted herein.

Next, the imaging by using the digital camera 40 and the printing order based on the picked-up digital image information will be explained hereunder. The digital camera 40 has at least two operation modes, i.e., a camera mode in which the image is picked up and the picked-up image is displayed, and a print mode in which the printing order is performed based on the picked-up digital image. As the option, a navigation mode described later may be provided.

As for the selection of the operation mode, the digital camera may be set to the desired operation mode by executing the mode setting operation when the power supply is turned ON. Otherwise, the digital camera may be set to the camera mode in default when the power supply is turned ON, and then the mode setting operation may be executed when the operation mode is changed into another mode. Since the camera mode is not basically different from the conventional mode, its description will be omitted herein.

Figure 2:
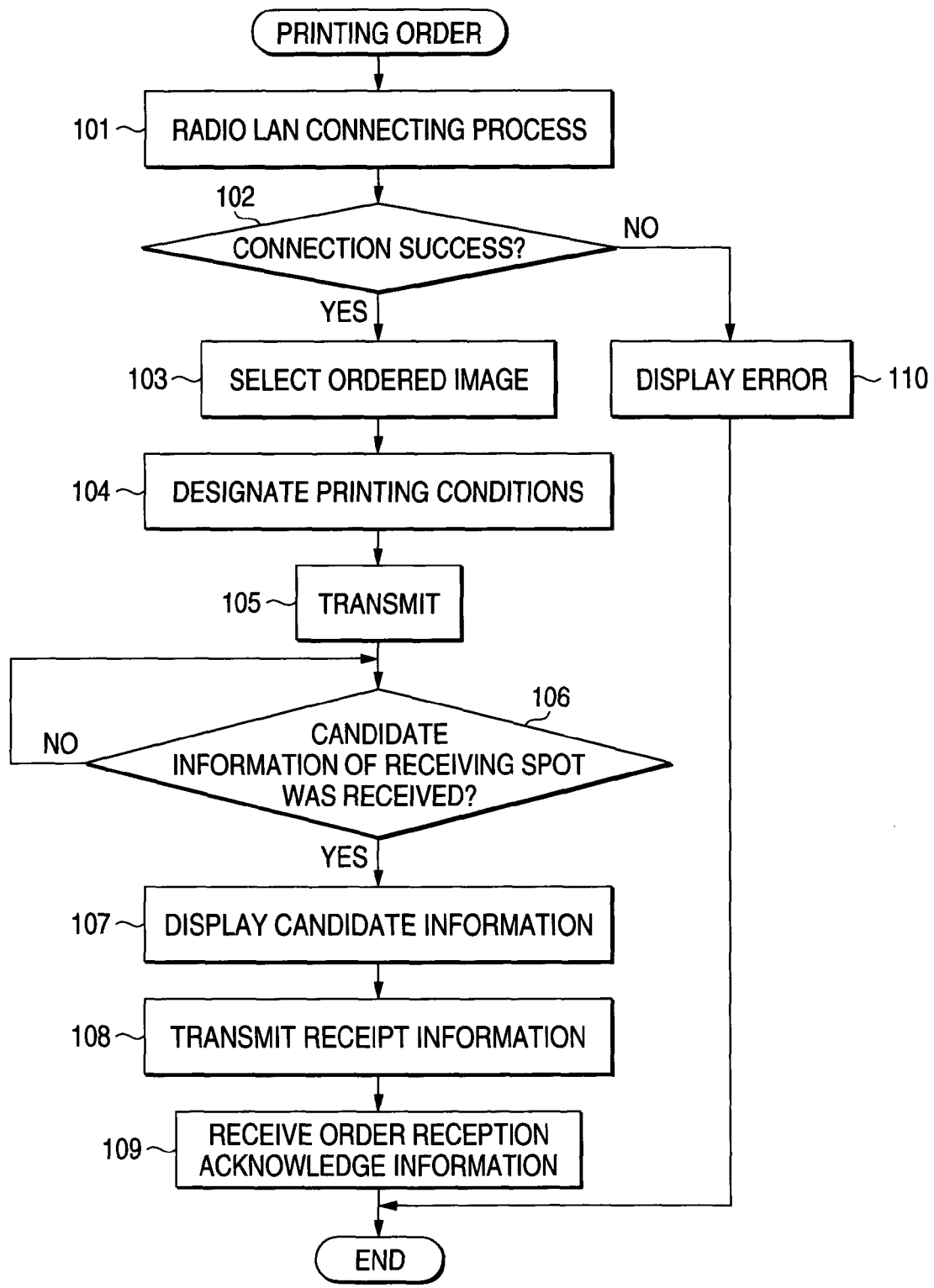
FIG. 2 is a flowchart showing a schematic operational flow of a digital camera at the time of a printing order.
Figure 3:
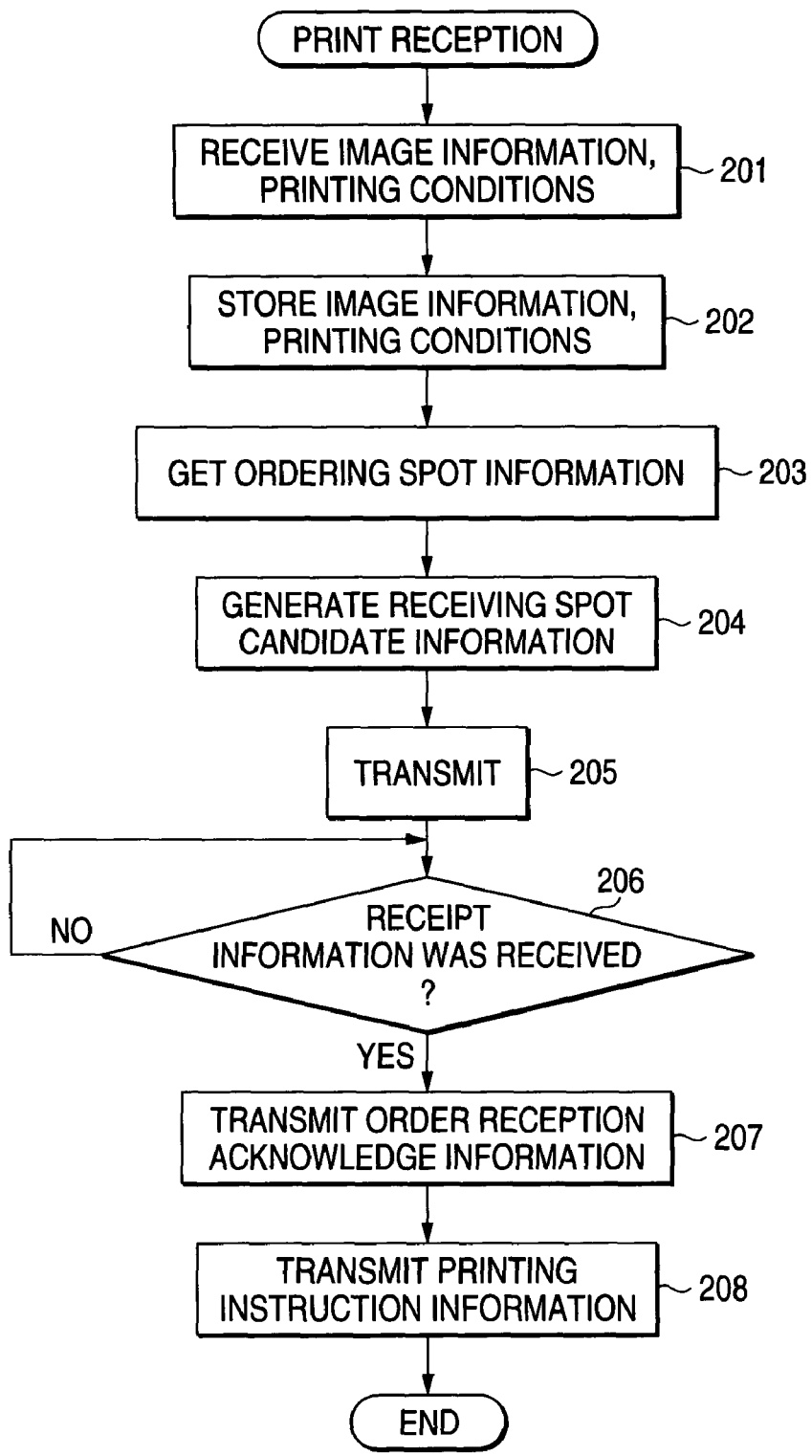
FIG. 3 is a flowchart showing a schematic operational flow of a print service server at the time of receiving the printing order.

A schematic operational flow of the digital camera at the time of the printing order is shown in FIG. 2. A schematic operational flow of the print service server at the time of receiving the printing order is shown in FIG. 3.

When the operation mode of the digital camera 40 is set to the print mode, the controller 43 starts a connecting process to the radio LAN via the radio interface portion 46 (step 101). If it is checked in step 102 that the digital camera 40 is connected to any of the access points 31 to 3n, a image based on digital image information recorded in the recording portion 42 is displayed. Then, a user selects desired images to be printed (step 103) and designates printing conditions such as print size, number of sheets of the print, etc. (step 104). As the image to be printed, one sheet or plural sheets of images may be selected.

When settings of the image selection and the printing conditions are finished, the digital camera 40 transmits the selected digital image information and printing conditions to the print service server 10 via any one of the access points 31 to 3n and the network 20 (step 105). Then, the digital camera 40 waits the response issued from the print service server 10 (step 106).

If the connecting process to the radio LAN failed in step 102, the error display is given in step 110, and the printing ordering process is ended. Here, such process may not be ended immediately after the error display, and the selection of the ordered image and the designation of the printing conditions may be executed. In such case, the selected ordered image and printing conditions are held, and then the connecting process to the radio LAN is carried out again automatically or by the instruction issued from the operating portion 44.

Moving to FIG. 3, when the print service server 10 receives the printing order from the digital camera 40, such print service server 10 receives the digital image information to be printed and the printing conditions (step 201). The digital image information and the printing conditions are stored in a memory device (not shown) (step 202). Then, the printing ordering spot information are obtained in step 203. Since the ordering spot is the position where the digital camera 40 is present and the installation position of the access point, to which the digital camera 40 is connected, corresponds almost to the ordering spot, the printing ordering spot information is derived from information of the access point that is being connected. In this case, if the GPS system is installed into the digital camera 40, the ordering spot information can be obtained by receiving the GPS information together with the digital image information to be printed and the printing conditions. In such case, it is not required to connect the print service server 10 and the digital camera 40 via the access point.

Then, the print service server 10 generates the receiving spot candidate information of a print by utilizing the ordering spot information (step 204). The candidate information for receiving-spot includes print receivable time information at that spot and information about an attraction corresponding to the candidate information. The information about an attraction corresponding to the candidate information, is, for example, a waiting time of an attraction within a predetermined range that includes the ordering spot and the receiving spot indicated by the candidate information, an available time of an attraction, a moving time to an attraction, advance order information, etc. In order to form these information, the information about attractions in the amusement park, and data about crowed situation, moving times between respective facilities, reserved situation, etc. must be stored in the database 60 and updated on occasion. The management of these information is performed by a managing server (not shown) in the amusement park.

In forming the information about the attraction, model moving route information including the available attractions from the ordering spot, i.e., the current position of the user, to the receiving spot indicated by the candidate information may also be prepared.

Also, visiting history information of the owner of the digital camera every attraction may be stored in the database 60, and then the attraction visiting history information of the user may be added to the prepared information about the attraction. The visiting history information may be taken into consideration when the model route is prepared.

Also, the map information to cover a predetermined area containing the ordering spot, i.e., the current position of the user, and the receiving spot indicated by the candidate information may be added to the information about the attraction. In addition, shooting spots in the amusement park may be included in this map information.

Figure 5:
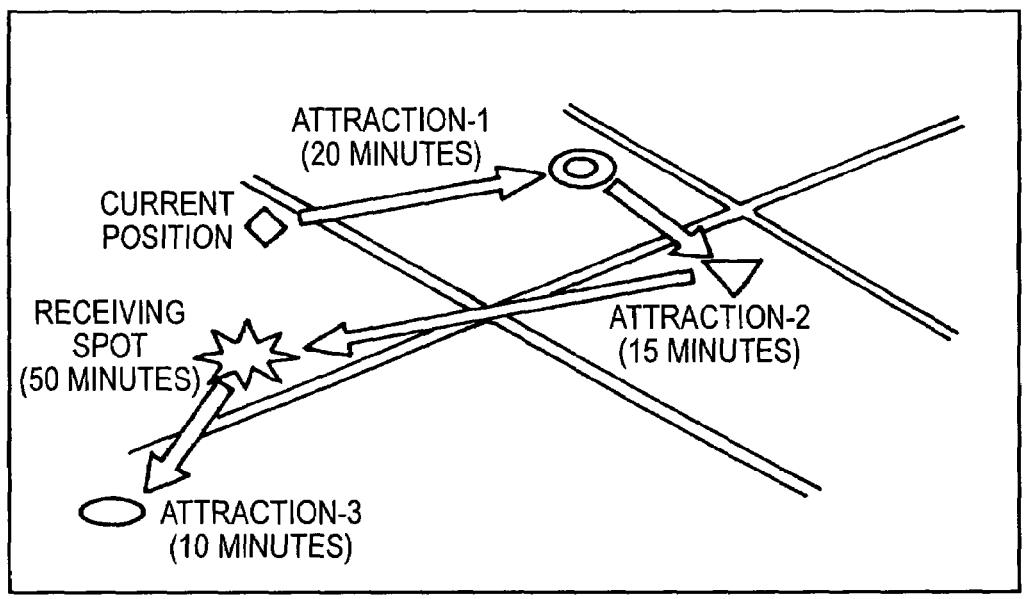
FIG. 5 is a display example of receiving spot candidate information and corresponding attraction information.

Returning to FIG. 2, the digital camera 40 receives the receiving spot candidate information (including the information about the attraction) from the print service server 10 (step 106). Then, the digital camera 40 displays the received receiving spot candidate information and the corresponding information about the attraction on the display 45 (step 107). A display example is shown in FIG. 5. In the example in FIG. 5, a model course from the printing ordering spot to the receiving spot indicated by the receiving spot candidate information is shown, and respective waiting times are also shown.

A plurality of service shops where the user can receive a print are provided in the amusement park. Thus, since normally the display 45 of the digital camera 40 cannot display all the service shops, the print service server 10 transmits the receiving spot candidate information separately at plural times (step 205). The transmitting order of receiving spot candidate information may be set arbitrarily, but the print service server 10 can transmit such information in earlier order of receivable times. Also, if desired receiving time information of the user are transmitted from the digital camera 40, the print service server 10 can transmit such information in closer order of desired receiving times of the user.

If the receiving spot candidate information are transmitted separately at plural times, the receiving spot candidate information are displayed in step 107 and then such receiving spot candidate information may be transmitted in response to the next candidate transmitting instruction issued from the user, or such receiving spot candidate information may be transmitted sequentially in parallel with the display in step 107.

The user selects the receiving spot with reference to the information displayed in step 107, and then transmits such spot information to the print service server 10 as the receipt information (step 108). Then, in step 109, the order reception acknowledge information is received from the print service server 10, and ends the printing order process.

Returning to FIG. 3, when the print service server 10 receives the print reception information in step 206, the print service server 10 transmits the order reception acknowledge information to the digital camera 40 (step 207). Then, the print service server 10 transmits the printing instruction information including the digital image information and the printing condition information stored in step 202 to the printing server that corresponds to the received receipt information, and then the printing receiving process is ended (step 208).

The print service server 10 may offer the reserved situation of the attraction that takes a reservation or needs the reservation, and then may accept the reservation. The reservation accepting process may be executed by the print service server 10 by itself, or may be delivered simply to the managing server (not shown).

The system in FIG. 1 can be employed not only in the print service but also in a navigation service in the amusement park. The navigation service utilizes the display function for the receiving spot candidate information containing the attraction information used in the print service.

Figure 4:
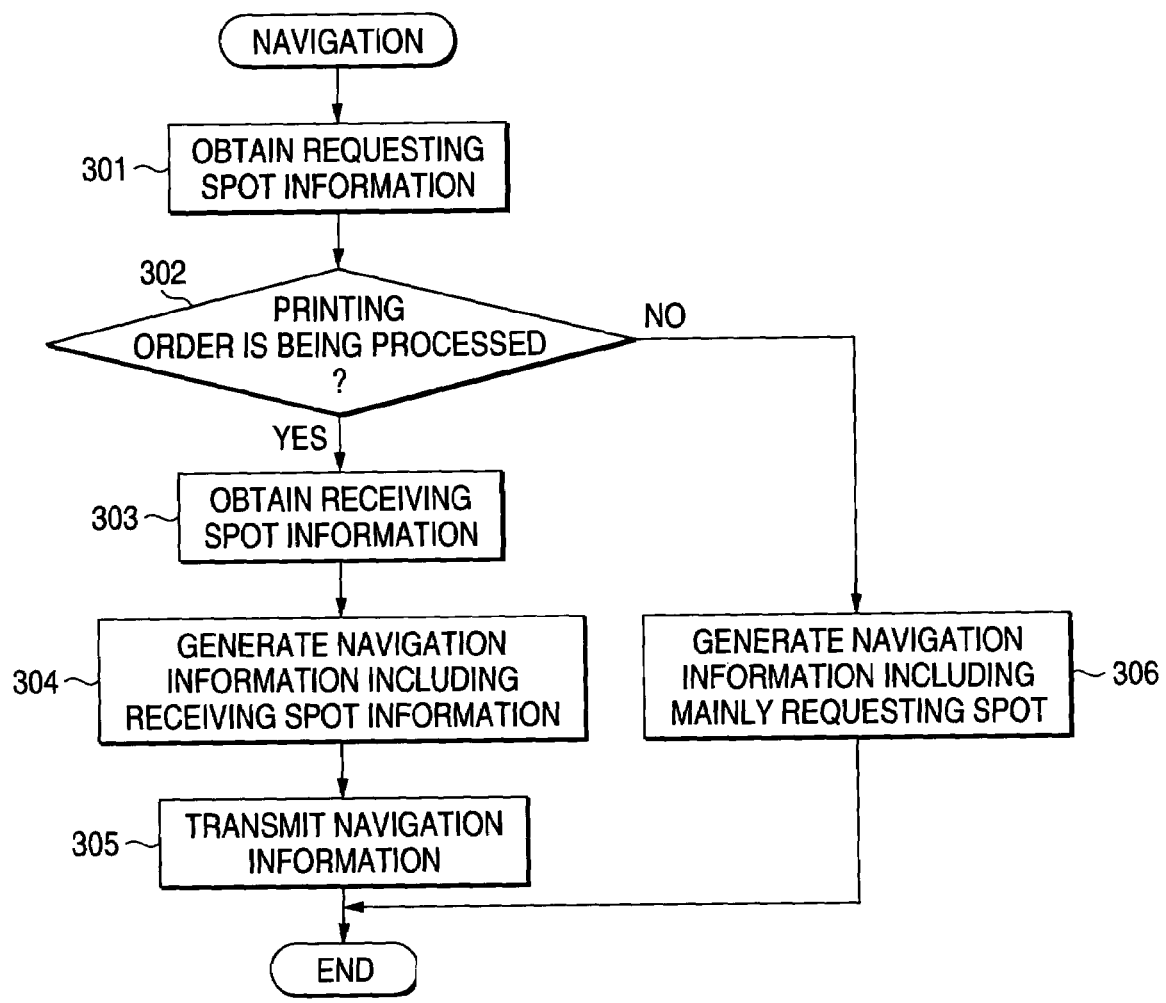
FIG. 4 is a flowchart showing a schematic operational flow of the print service server at the time of a navigation service.

A schematic operational flow of the print service server when the navigation service is provided is shown in FIG. 4. When the print service server 10 receives a navigation request, the print service server 10 obtains the requesting spot information (step 301). This step is the process similar to step 203. Then, the print service server 10 looks up the ID of the digital camera as the requesting person, etc., and then determines whether or not the printing order issued from the same digital camera is being processed (step 302). In this case, such server 10 decides the printing order is in process until the delivery of the made print is completed.

Figure 6:
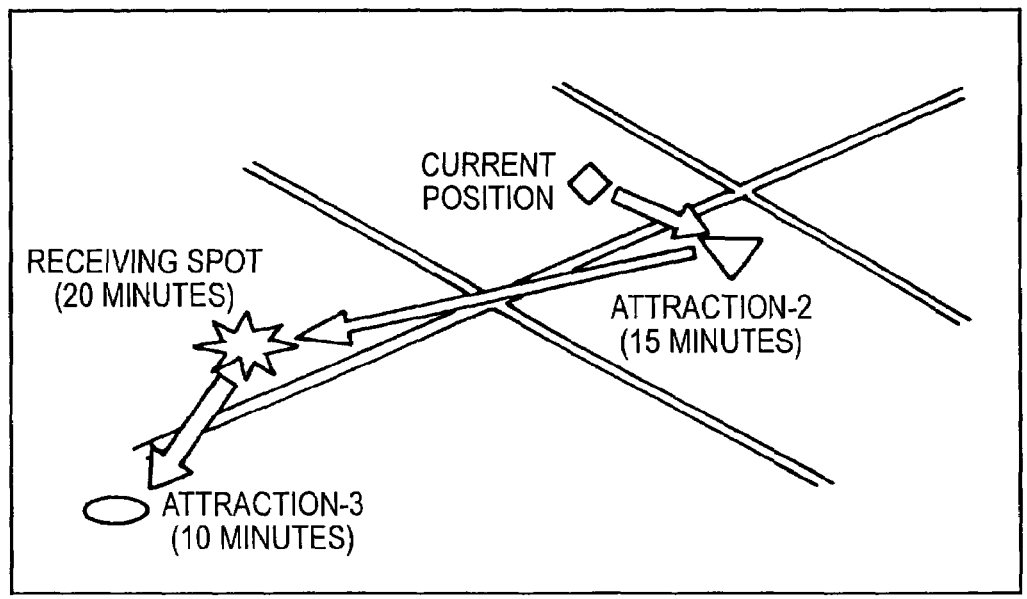
FIG. 6 is a display example of the attraction information at the time of the navigation service.

If the printing order is in process, i.e., if the delivery of the made print is not completed, the print service server 10 obtains the receiving spot information to perform the navigation of the receiving spot (step 303). Then, the print service server 10 generates a navigation information including the information about attractions in the area where the receiving spot and the requesting spot are present (step 304). Then, such server 10 transmits the navigation information (step 305). A display example is shown in FIG. 6. FIG. 6 shows a display example in which the position of the user moves from the position in the display example in FIG. 5 by a predetermined distance.

In contrast, if the printing order is not in process, the print service server 10 generates a navigation information including the information about attractions in the area accommodating a requesting spot as the center in step 306. When the model course is to be indicated, the print service server 10 forms such course by utilizing the history information of the user.

According to the above explanation, the print service system can effectively provide the print service in the amusement park and the print service server employed in such system can be provided.

What is claimed is:

1. A print service system for providing a print service based on digital image information in an amusement park, comprising:
a print service server connected to a network; and
a digital camera that has a communication function and is connected to the print service server via the network,
wherein the digital camera transmits digital image information to be printed and order information including receipt information indicating a spot for receiving a print to the print service server via the network, and
wherein the print service server, which is accessible to a database storing information about attractions in the amusement park, transmits candidate information of receiving spots including receivable time information and the information about attractions corresponding to the candidate information to the digital camera prior to receiving the receipt information based on existing position information of the digital camera, and also transmits print instruction information including the digital image information received from the digital camera to a printing device provided in a spot that corresponds to the receipt information received from the digital camera,
wherein the digital camera transmits a desired time for receiving a print to the print service server, and the print service server transmits the candidate information of receiving spots in order that the receivable time is closer to the desired time.

2. The print service system according to claim 1, wherein the digital camera is connected to the print service server via a plurality of radio communication access points that are provided in the amusement park, and the print service server obtains existing position information of the digital camera based on installation positions of the radio communication access points.

3. The print service system according to claim 1, wherein the print service server transmits the candidate information of receiving spots prior to the receivable time.

4. The print service system according to claim 1, wherein the print service server transmits the information about attractions within a predetermined area which includes an existing position of the digital camera and receiving spots indicated by the candidate information to the digital camera with the candidate information.

5. The print service system according to claim 4, wherein the print service server transmits a model moving route information including available attractions from the existing position of the digital camera to the receiving spot indicated by the candidate information to the digital camera.

6. The print service system according to claim 1, wherein the print service server, which is accessible to a visiting history database of a user, transmits visiting history information of an owner of the digital camera for every attraction to the digital camera.

7. The print service system according to claim 1, wherein the print service server accepts a reservation of the attraction.

8. The print service system according to claim 1, wherein the print service server transmits the candidate information of the receiving spot and the information about attractions corresponding to the candidate information to the digital camera with map information of the amusement park.

9. The print service system according to claim 8, wherein the print service server transmits the map information of the amusement park, which includes the receiving spot transmitted from the digital camera and the existing spot of the digital camera, to the digital camera in response to a request from the digital camera.

10. The print service system according to claim 8, wherein the map information to be transmitted to the digital camera includes imaging spot information of the amusement park.

11. A print service server for providing a print service based on digital image information in an amusement park,
wherein the print service server is accessible to a database storing information about attractions in the amusement park, and is connected to a digital camera via a network,
wherein the print service server receives digital image information to be printed and order information including receipt information indicating a spot for receiving a print via the network, and transmits print instruction intonation including the digital image information received from the digital camera to a printing device provided in a spot that corresponds to the receipt information received from the digital camera, and transmits candidate information of receiving spots including receivable time information and the information about attractions corresponding to the candidate information to the digital camera prior to receiving the receipt information based on existing position information of the digital camera,
wherein the print service sarver receives a desired time for receiving a print from the digital camera, and the print service server transmits the candidate information of receiving spots in order that the receivable time is closer to the desired time.

12. The print service server according to claim 11, wherein the print service server is connected to the digital camera via a plurality of radio communication access points that are provided in the amusement park, and
wherein the print service server utilizes installation position information of the radio communication access points as existing position information of the digital camera.

13. The print service server according to claim 11, wherein the print service server transmits the candidate information of receiving spots prior to the receivable time.

14. The print service server according to claim 11, wherein the print service server transmits the information about attractions within a predetermined area which includes an existing position of the digital camera and receiving spots indicated by the candidate information to the digital camera with the candidate information.

15. The print service server according to claim 14, wherein the print service server transmits a model moving route information including available attractions from the existing position of the digital camera to the receiving spat indicated by the candidate information to the digital camera.

16. The print service server according to claim 11, wherein the print service server, which is accessible to a visiting history database of a user, transmits visiting history information of an owner of the digital camera for every attraction to the digital camera.

17. The print service server according to claim 11, wherein the print service server accepts a reservation of the attraction.

18. The print service server according to claim 11, wherein the print service server transmits the candidate information of the receiving spot and the information about attractions corresponding to the candidate information to the digital camera with map information of the amusement park.

19. The print service server according to claim 18, wherein the print service server transmits the map information of the amusement park, which includes the receiving spot transmitted from the digital camera and the existing spot of the digital camera, to the digital camera in response to a request from the digital camera.

20. The print service server according to claim 18, wherein the map information to be transmitted to the digital camera includes imaging spot information of the amusement park.

* * * * *